May 13, 1969 JAMES E. WEBB 3,443,390
ADMINISTRATOR OF THE NATIONAL AERONAUTICS
AND SPACE ADMINISTRATION
SPACE SIMULATOR
Filed Oct. 5, 1967 Sheet 1 of 2
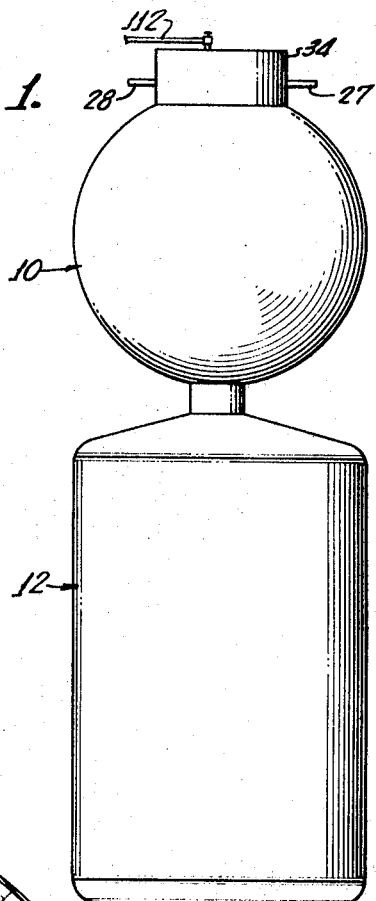
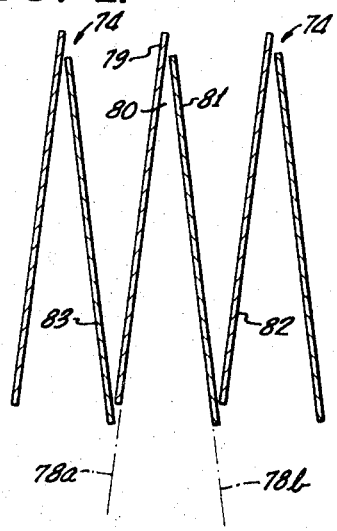
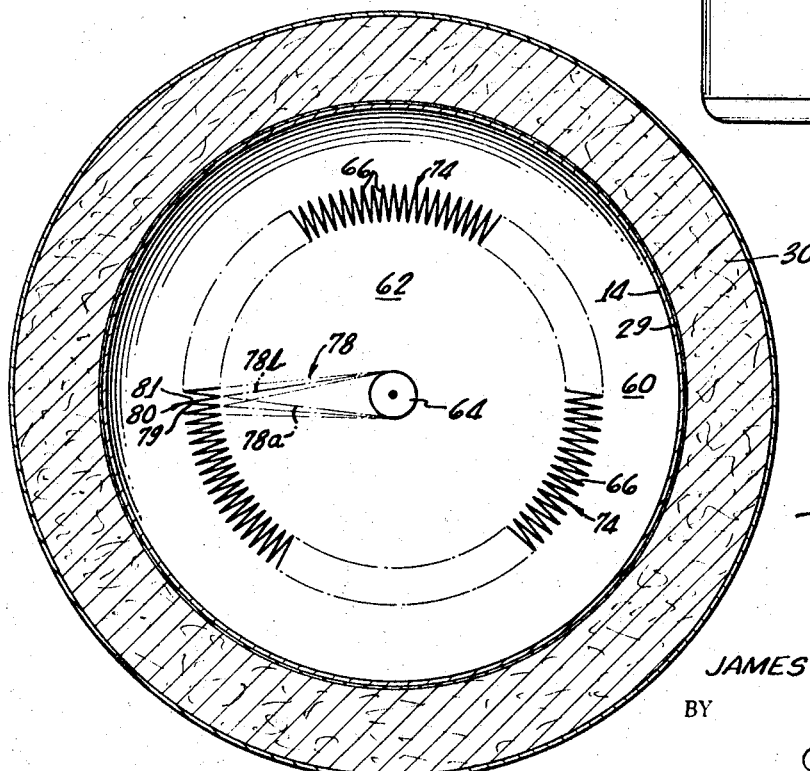
INVENTOR.
JAMES B. STEPHENS
BY
ATTORNEYS.

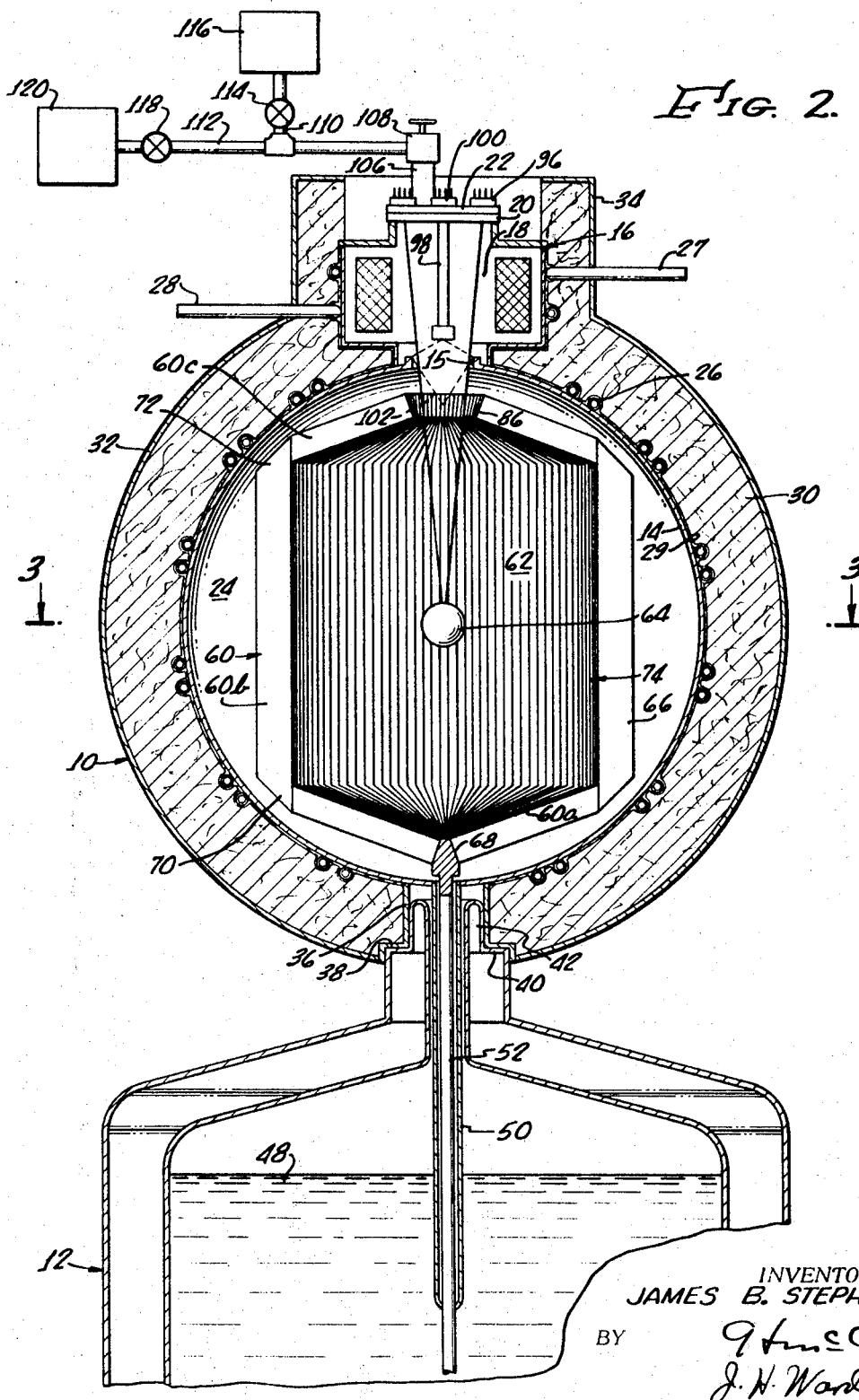

United States Patent Office 3,443,390
Patented May 13, 1969

3,443,390
SPACE SIMULATOR
James E. Webb, Administrator of the National Aeronautics and Space Administration with respect to an invention of James B. Stephens, La Crescenta, Calif.
Filed Oct. 5, 1967, Ser. No. 673,227
Int. Cl. F25b 41/00; B64g 7/00; B01d 5/00
U.S. Cl. 62—55.5                                              8 Claims

ABSTRACT OF THE DISCLOSURE

Within a vacuum chamber there is positioned a secondary wall made of thin ribbons of silver or copper arranged in the form of inwardly extending pleats or wedge fins. A good thermal conductor connects the secondary wall to a quantity of liquid helium confined within its shipping Dewar so that the secondary wall is kept cold to serve as a molecular sink or anechoic chamber for molecules.

Origin of the invention

The invention described herein was made in the performance of work under a NASA contract and is subject to the provisions of Section 305 of the National Aeronautics and Space Act of 1958, Public Law 85–568 (72 Stat. 435; 42 USC 2457).

Background of the invention

This invention relates to apparatus for simulating space for permitting the study of the effect of space on items such as spacecraft components, and particularly to such apparatus which is practical for commercial laboratory situations.

The surface of an article exposed to the earth's atmosphere is normally constantly being bombarded with molecules and is subjected to other environmental conditions. An object in outer space, however, such as a spacecraft component, has a vastly different situation in that there is no molecular bombardment. Any molecules leaving the surface of an object in space never return and are in effect absorbed in the molecular sink of space. Radiation energy in space also affects the surface characteristics of an item in space. Because of these differences it is desirable to study the surface phenomena produced in space surroundings without actually sending an item into space, and hence it is necessary that this be accomplished under simulated space conditions. The need therefore exists for practical simulator apparatus.

In a standard ultra high vacuum chamber used to simulate space, a molecule leaving the object being tested strikes the walls of the chamber and usually rebounds, often returning to the object being tested. This may occur many times before that particular molecule finds the outlet and is evacuated through a vacuum pump. Consequently, the surface effect phenomena cannot accurately be observed in such situation. It has been necessary in the past to clean test items to reduce the number of molecules free to depart from the test item, before testing in a standard ultra high vacuum chamber. These cleaning processes are detrimental and impractical for most test items. Through the use of a molecular sink it is now unnecessary to go through this cleaning procedure.

One type of molecular sink is a cryogenic pump which includes an enclosure wall maintained at an extremely cold temperature. When a molecule strikes the cold surface, it is trapped by being frozen out of circulation. Cooling of the wall surface presents a problem in the practical development of a molecular sink for general laboratory use.

In one approach, liquid helium is pumped through cooling tubes in contact with the wall to be cooled. Liquid helium is an excellent coolant but is one of the most difficult substances to pump or move from one place to another without loss. Considerable cooling losses occur when the helium is circulated by the pump through a cooling system, and when the helium is transferred from its shipping container into another container. The tubes and the pumping apparatus also add considerably to the cost of the space simulator.

Summary of the invention

In accordance with this invention, the need for pumping liquid helium has been eliminated and a less costly approach is provided for a small molecular sink suitable for general laboratory use. Within a vacuum chamber there is positioned a secondary wall forming a molecular sink composed of material which has a high thermal conductivity and which is lightweight so that it may be maintained at a low temperature with a minimum of coolant. A good thermal conductor connected to the secondary wall extends out through the wall of the vacuum chamber and is submerged in a quantity of liquid helium confined within its original Dewar or shipping container. Thus, the shipping container in effect becomes part of the space simulator apparatus and the liquid transfer operation is eliminated.

Preferably, the secondary wall is formed of thin ribbons or strips of metal foil made of copper or silver. These ribbons are arranged in the form of inwardly extending pleats or wedge fins wherein each ribbon forms a side of the pleat by having one end of each ribbon attached directly to the end of the thermal conductor so that good thermal transfer is obtained. A wall with this pleat construction is very efficient for capturing molecules, and utilizing this cryogenic pumping arrangement together with additional mechanical, chemical, and electrical vacuum pumping means provides an extremely effective molecular sink.

Detailed description and drawings

Further features and advantages of the invention will become apparent with reference to the following detailed description and drawings in which:

FIG. 1 is a side elevational view of the space simulator apparatus of the invention;

FIG. 2 is an enlarged sectionalized view of a portion of the apparatus of FIG. 1;

FIG. 3 is a cross-sectional view on line 3—3 of FIG. 2 illustrating the nature of the secondary wall forming the molecular sink of the invention; and FIG. 4 is an enlargement of a portion of the secondary wall illustrating the overlapping relation of the ribbons forming the wall.

Referring first to FIGURES 1 and 2, the space simulator apparatus of the invention may be seen to include a vacuum chamber assembly 10 supported on the upper end of a shipping and storage Dewar or container 12. The vacuum chamber assembly 10 includes an inner sphere 14 preferably spun from stainless steel. The sphere may be formed in two or more sections and subsequently welded or otherwise joined together, however, in the arrangement illustrated, the joints are not shown. An inlet 15 is formed in the upper portion of the sphere 14.

An ion pump 16 is attached at its lower end to the top of the sphere 14 surrounding the opening 15. A flange 20 surrounds an opening in the upper end of the ion pump 16 and is closed by a mating cover or flange plate 22. The flange plate 22 may be sealed to form a vacuum tight chamber 24 within the sphere. The ion pump 16 is connected to a suitable power source (not shown).

A metal tube 26 having an inlet 27 and an outlet 28 is wound around the periphery of the sphere 14 and the ion pump 16 and is suitably secured to the sphere by welding or brazing. The combined unit is then oversprayed with a layer 29 of copper or other good conductor to provide efficient thermal transfer throughout the sphere.

The sphere 14 and the ion pump 16 are encased in a thick layer 30 of suitable insulating foam material confined within an outer shell 32. An upper neck portion 34 of the shell 32 surrounds the ion pump 16 and extends beyond the flange plate 22 to provide adequate insulation for the chamber 24. Attached to the lower end of the sphere 14 is a collar 36 having an outwardly extending lower flange portion 38 which mates with a similar flange 40 formed on the open upper end of the open Dewar 12, which is of conventional construction. Thus, the mouth 42 of the Dewar 12 fits within the upper portion of the collar 36 while the flanges 38 and 40 cooperate so that the sphere is supported on the Dewar.

Also attached to the lower end of the stainless steel sphere is an elongated tubular element 50 which opens into the vacuum chamber 24 and extends downwardly into the Dewar 12. A conductor rod 52 or thermal conduit formed of high purity silver or copper is positioned with its lower end submerged in a quantity of liquid helium 48 in the Dewar and its upper end extending through the tubular element 50 and into the chamber 24 formed by the stainless steel sphere 14. The rod 52 is brazed or otherwise suitably secured to the lower end of the tubular element 50, while the remainder of the element 50 is spaced from the rod. The connection between the element 50 and the conductor rod 5 is vacuum tight so that helium cannot pass into the vacuum chamber 24.

The tubular element 52 is slightly spaced from the walls of the Dewar neck so that helium vapor can escape. Also in the arrangement illustrated, the inter-engagement of the collar flange 38 and the Dewar neck flange 40 is such that the vapor can escape between these two surfaces into the surrounding atmosphere. As an alternative construction, the helium vapor can be ducted through passages (not shown) adjacent the exterior of the stainless steel sphere to utilize the cooling capacity of such gaseous helium.

Within the sphere 14 there is positioned an inner or a secondary wall 60 which forms a sink for capturing molecules within the vacuum chamber. The secondary wall 60 is spaced from the surrounding sphere 14 and is formed to define an inner enclosure 62 into which a test item 64, illustrated as a sphere, is positioned to be studied. As can be seen, the secondary wall 60 has a somewhat cylindrical shape with the upper and lower sections 60a and 60c being conical. The wall 60 is formed of metal which is a good thermal conductor such as copper or silver. In accordance with the invention, the walls are formed of thin ribbons 66 or strips of foil. The lower end of each ribbon is attached, in suitable fashion to provide efficient thermal transfer, to a conical member 68 mounted on the upper end of the conductor rod 52.

In forming the ribbons 66 into the wall configuration illustrated in FIG. 2, each ribbon extends outwardly from the cone 68 at a large angle with respect to a vertical line through the cone to form the lower section 60a of the secondary wall 60. Each ribbon is folded upon itself at the corner 70 so that it extends upwardly to provide the major central section 60b of the secondary wall 60. Each ribbon is then further folded upon itself at the corner 72 to extend inwardly and upwardly forming the upper sections 60c of the secondary wall 60. Since the enclosure 62 is not very large, the ribbons 66 of foil may be supported only by their connection to the cone 68 and the upper end of the rod 52 and their own rigidity. Thus, they are in effect supported in cantilever fashion. If necessary, the secondary wall 60 may be further supported by additional insulated members (not shown) extending between the stainless steel sphere 14 and the secondary wall 60.

To form an efficient molecular sink, the ribbons 66 forming the secondary wall are arranged in the shape of inwardly extending pleats 74 or wedge shaped fins as may be seen in FIGS. 2–4. Each ribbon 66 forms one side of a single pleat or fin with the fin extending upwardly from the cone 68 at the bottom of the secondary wall 60 to the top of the secondary wall. Consequently, the angular relationship between the fins and the test item 64 remains about constant throughout its length, with the inner edge of a fin pointing towards the test item.

Each ribbon 66 or each side of a fin 74 is preferably arranged to be aligned with an imaginary tangent 78 to the test item 64 illustrated as a sphere in the center of the enclosure. That is, as illustrated in FIGS. 3 and 4, one side 79 of a fin 80 is aligned with a tangent 78a to one side of the test item 64 and the other side 81 is aligned with a tangent 78b to the other side of the test item. The size of the test items will vary and may exceed the tangent sphere. The portions of the test item that produce the majority of the outgassing should be positioned within the tangent sphere.

As also seen from FIG. 4, the ribbons are arranged in overlapping fashion so that only the edge thickness of one ribbon is exposed to the test item. That is, ribbon 81 extends inwardly further than the adjacent ribbon 82 so that only the inner edge of ribbon 81 is exposed to the test item 64. Similarly, ribbon 83 extends inwardly further than ribbon 79 so that only the edge of ribbon 83 is exposed.

The test item 64 is inserted into the vacuum chamber 24 through an opening 86 formed in the top of the secondary wall 60 and the opening 15 in the sphere 14 as seen in FIG. 2. The test item is supported by a rod or wires 90 connected to the chamber flange plate 22. Electrical connections for the test item may be made through the terminals 96 schematically illustrated on the flange plate.

Within the ion pump 16 there is positioned a titanium sublimator 98 mounted on the flange plate 22 to sublimate titanium onto the inside of the ion pump. Electrical terminals 100 for the sublimator are accessible from outside the chamber. The structural details of the titanium sublimator or the ion pump do not form a part of the invention and hence will not be given. Carried on the lower end of the titanium sublimator 98 is a shield 102 schematically illustrated by dotted lines in FIG. 2. This shield 102 prevents heat radiation from the sublimator 98 from striking the test item 64.

Also mounted on the flange plate 22 is a roughing line 106 leading to a control valve 108 further connected to a pair of additional lines 110 and 112. The line 110 leads through a valve 114 to a conventional mechanical vacuum pump 116. The other line 112 leads through a valve 118 to a cryosorption pump 120 which sorbs gas molecules. The cryosorption pump includes a highly porous substance having a large amount of surface area which is cooled to a very low temperature by a coolant such as liquid nitrogen, and the details of such are not part of this invention.

*Operation*

In operation of the space simulator apparatus, the flange plate 22 of the vacuum chamber assembly 10 is removed and a test item 64 is suspended by its instrumentation wires 90 from the flange plate. New filaments for the titanium sublimator 98 are installed and the sublimator and the test item are then inserted into the chamber 24 with the test item extending into the inner enclosure 62. The flange plate 22 carrying these items is then sealed to the top flange 20 of the chamber. The main control valve 108 and the valve 114 leading to the mechanical vacuum pump 16 are opened while the valve 118 leading to the cryosorption pump 120 is closed. The vacuum pump 116 is then energized to mechanically apply a vacuum to the chamber by withdrawing a high percentage of the molecules within the chamber.

When the vacuum has attained the level within the capacity of the mechanical pump 116, its valve 114 is closed and the valve 118 leading to the pre-cooled cryosorption pump 120 is opened. A large percentage of the molecules reaching the sorption pump 120 are trapped on the large cold surfaces of the pump molecular sieve material. After a period of time, the ion pump 16 is also energized causing particles in the vicinity of the pump to be ionized and captured within the pump.

When the molecular content of the chamber 24 has been reduced to the level which can be effectively attained through the cryosorption pump 120, it is valved off and the titanium sublimator 98 is energized causing titanium to sublimate. The sublimed titanium condenses onto the relatively large inner surfaces of the ion pump 16. The titanium coating "pumps" chemically active molecules, and if desired the rate of sublimation may be controlled to match the rate that these molecules are generated.

At this point, the chamber is at an ultra high vacuum level with a very low molecule content. Molecules leaving the surface of the test item strike the secondary wall surfaces and rebound back into the enclosure 60. The chamber 14 is then cooled by liquid nitrogen ducted through the tube 26 surrounding the stainless steel sphere. The nitrogen also cools the ion pump to improve its efficiency.

The conductor rod 52 then is inserted into a Dewar of liquid nitrogen to chill the secondary wall through conduction to approach the temperature of the liquid nitrogen. When the secondary wall has been cooled to this level, the assembly 10 is then transferred to a Dewar 12 of liquid helium 48 and the lower end of the conductor rod 52 is submerged into the helium. The conductor rod efficiently causes a thermal transfer which reduces the secondary wall temperature to approach that of the liquid helium. At this reduced temperature, the molecules leaving the test item 64 that strike the secondary wall surfaces are efficiently trapped on the wedge fins forming a molecular sink or anechoic chamber for molecules. Thus, due to the combination of the various means disclosed to reduce molecular flux within the vacuum chamber and also due to the geometry of the secondary wall to reduce rebounding molecular flux in the direction of the test item, conditions very close to space are simulated.

The space simulator apparatus described herein may be fabricated in various sizes. However, due to the low temperatures involved it is essential that the secondary wall 60 and the conductor rod 52 be made of high purity silver or copper. As the size of the enclosure defined by the secondary wall increases, the material costs also increase rapidly both for the wall itself and correspondingly for the necessary size of the conductor rod 52. Hence, the arrangement is considered most practical in relatively small sizes.

For example, the Dewar 12 of liquid helium illustrated in FIG. 1 is intended to approximate a 100 liter container and the relative size of the vacuum chamber asssembly 12 with respect to the container is indicated by the drawing. Thus, the outer diameter of the assembly for a practical arrangement is approximately 15 inches.

The silver or copper ribbons employed to fabricate the secondary wall are approximately 1 inch in width and are about .0005 to .005 inch thick, or as thin as possible consistent with strength and handling requirements. The silver or copper conductor rod to be utilized with such a wall should be approximately ⅜ to ½ inch in diameter. With such an arrangement, a 100 liter Dewar of liquid helium can maintain the secondary wall at its desired reduced temperature for a considerable period of time depending upon the test item produced radiation load.

Further details of the theory regarding the trapping of molecules on a pleated or wedge fin wall surface having the defined tagential relationship to the test item may be obtained by reference to the June 1966 issue of the Journal of Spacecraft and Rockets which includes an article by the inventor. Also included in the article is a description of a titanium sublimator and a general discussion regarding space simulators.

While basically only a single embodiment of the invention has been illustrated and described, it will be apparent that various modifications and changes will come to the mind of one skilled in the art. Accordingly, it is intended that all such changes and modifications that fall within the true spirit and scope of the invention be included in the appended claims.

What is claimed is:

1. Space simulator apparatus comprising:
   means defining a vacuum chamber;
   a secondary wall spaced inwardly within said chamber defining an enclosure formed of thin metal ribbons so arranged as to form inwardly extending pleats and made of material having a good thermal conducting characteristics;
   a container of low temperature coolant positioned exterior of the chamber; and
   means forming a good thermal conductive path between the secondary wall and the coolant.

2. The apparatus of claim 1 wherein the thermal conductive path is formed by a metal rod having one end positioned in the coolant and its other end attached to the secondary wall.

3. The apparatus of claim 1 wherein the container of coolant comprises liquid helium contained in an insulated shipping container.

4. The apparatus of claim 1 wherein said vacuum chamber includes:
   an inner metal wall surrounded by insulation; and
   a tube in contact with the metal wall for circulating coolant to maintain the temperature of the walls at a low level.

5. The apparatus of claim 4 including:
   means for mechanically pumping molecules from the chamber;
   an ion pump surrounding the opening into the chamber for pumping the chamber;
   means for cryosorbing ions or molecules leaving the chamber; and
   means for applying a chemical to the ion pump inner surfaces for chemically capturing particles striking such surfaces.

6. In space simulation apparatus:
   (a) a molecular sink positioned within a vacuum chamber including a plurality of foil-like metal ribbons arranged to define an enclosure having an opening therein through which a test item may be inserted to be supported within the enclosure, the ribbons being so disposed as to form a plurality of inwardly extending wedge shape fins oriented in a manner such that the planar surfaces of the ribbons are in approximate parallel disposition with imaginary tangents of an imaginary sphere approximately defining the periphery of a typical test item within the enclosure, whereby the test item is caused to see an array of thin edges and valleys; and
   (b) means for maintaining the ribbons at a temperature approximating the temperature of liquid helium.

7. The molecular sink of claim 6 including:
   a vertically oriented rod made of a material which is a good thermal conductor, with the lower end of each ribbon being attached to the rod;
   said ribbons extending outwardly away from the rod to define a lower section of the enclosure;
   each ribbon being folded upwardly on itself at an angle such that it extends vertically from the lower section to define a side wall section of the enclosure; and
   each ribbon being once more folded upon itself at an angle so that its upper end extends inwardly to form an upper section of the enclosure.

8. A laboratory molecular sink for simulating space comprising:
   a relatively large Dewar containing liquid helium and having an opening in its upper end;
   means defining a vacuum chamber supported on the upper end of the Dewar including an inner metal sphere surrounded by foam insulation and an outlet in the upper end of the sphere;
   pump means connected to the outlet for withdrawing molecules from the chamber;
   means for cooling the metal sphere including a tube wound around the sphere for conducting coolant therethrough, and a layer of heat conducting material covering the tubes and the metal sphere for providing good thermal conductivity between the coolant tubes and the sphere;
   a secondary wall spaced inwardly within the sphere defining an enclosure within the chamber, said secondary wall being formed of thin metal ribbons made of a material which is a good thermal conductor, said ribbons being arranged to form inwardly extending pleats;
   an elongated tubular element attached to the lower end of the sphere, defining an opening into the sphere, and depending into the Dewar; and
   an elongated metal rod extending through and supported by the tubular element, the lower end of the rod being submerged in the liquid helium in the Dewar, and the upper end of the rod being attached to and in good thermal contact with the secondary wall, the connection between the tubular element and the rod preventing vaporized helium from entering the chamber.

References Cited
UNITED STATES PATENTS

| | | | |
|---|---|---|---|
| 3,066,222 | 11/1962 | Poorman et al. | |
| 3,149,775 | 9/1964 | Pagano | 62—268 |
| 3,177,672 | 4/1965 | Seelandt | 62—55.5 |
| 3,253,423 | 5/1966 | Sonnabend | 62—514 |
| 3,262,279 | 7/1966 | Moore | 62—55.5 |
| 3,270,744 | 9/1966 | Katz et al. | 62—514 |
| 3,273,636 | 9/1966 | Hickey et al. | 62—268 |
| 3,352,122 | 11/1967 | Rothenberg et al. | 62—268 |

LLOYD L. KING, *Primary Examiner.*

U.S. Cl. X.R.

62—268